Patented Aug. 12, 1952

2,606,354

UNITED STATES PATENT OFFICE 2,606,354

ROTATABLE CORE STRUCTURE FOR CONCRETE PIPE-FORMING MOLDS AND FLUID-ACTUATED BRAKE MEANS THEREFOR

Vincent R. Jackson, Columbus, Ohio, assignor to Universal Concrete Pipe Company, Columbus, Ohio, a corporation of Ohio Application June 8, 1950, Serial No. 166,824

6 Claims. (Cl. 25—30)

This invention relates to an improved core structure for use in molding tubular cementitious or ceramic bodies, for instance, as in the formation of molded pipe.

In producing such pipe, it is conventional to employ a turntable on which is positioned in concentric and relatively spaced upright order an outer cylindrical mold or form and an inner core member, an annular space being formed between their adjacent wall surfaces, whereby to provide for the introduction, distribution and compaction of a cementitious or other mix used in pipe formation.

In such pipe-molding apparatus, it is desirable that the inner core member should rotate in unison with the outer form during the step of filling and compacting the annular space with an appropriate mix. This is done in order to reduce friction and abrasion between the surfaces of the apparatus and the material forming the mix. However, following the filling of the molding space with said mix, it is necessary to remove the core member from association with the outer mold and the compacted mix, since the uncured pipe body formed by the mix is retained in the outer form or mold during a subsequent curing or drying period in which the molded body sets and hardens sufficiently to permit the outer form or mold to be removed therefrom.

In removing the inner core structure it is desirable to break adhesion forces set up between the core structure or member and the molded pipe body. If the core member rotates at all times on the turntable in unison with the outer form or mold, the adhesion forces can not be readily broken, following the stopping of the turntable.

It is an object of the present invention to provide a core member so constructed as to rotate on a turntable in unison with an outer form or mold, to cease independently such rotation, or to revolve at a different rotational rate with respect to that of the outer form or mold.

Another object of the invention is to provide a means under ready and variable control of a machine operator for causing a core member to stop its rotation or rotate at different rates of speed about its longitudinal axis with respect to an associated outer form or mold.

Another object of the present invention is to provide a core member for molding tubular ceramic bodies, and wherein said member is so constructed and mounted that the same may rotate in unison with an associated outer form or mold during the pouring and tamping of a cementitious or ceramic mix introduced into the annular space between the core member and the outer form, and wherein provision is made for stopping, or reducing the rate of rotation of, the core member prior to arresting rotation on the part of the outer mold or form, to the end that the forces of adhesion, established between the mix or pipe body and the core member, may be completely broken at the time when it is desired to lift or otherwise remove the core member from association with the molded body.

It is another object of the invention to provide a core member for use in the manufacture of molded pipe in which the core member is formed to comprise a head section and a body section, the latter being rotatable with an associated turntable about a vertical longitudinal axis, and wherein provision is made for regulating the rotational rate of the body section relative to the head section.

A further object of the invention is to provide a core member of the character set forth with fluid-actuated brake or clutch means for controlling rotation of its turntable carried body section relative to its head section.

For a further understanding of the invention, including additional objects and advantages thereof, reference is to be had to the following description and the accompanying drawing, wherein.

Figure 1:
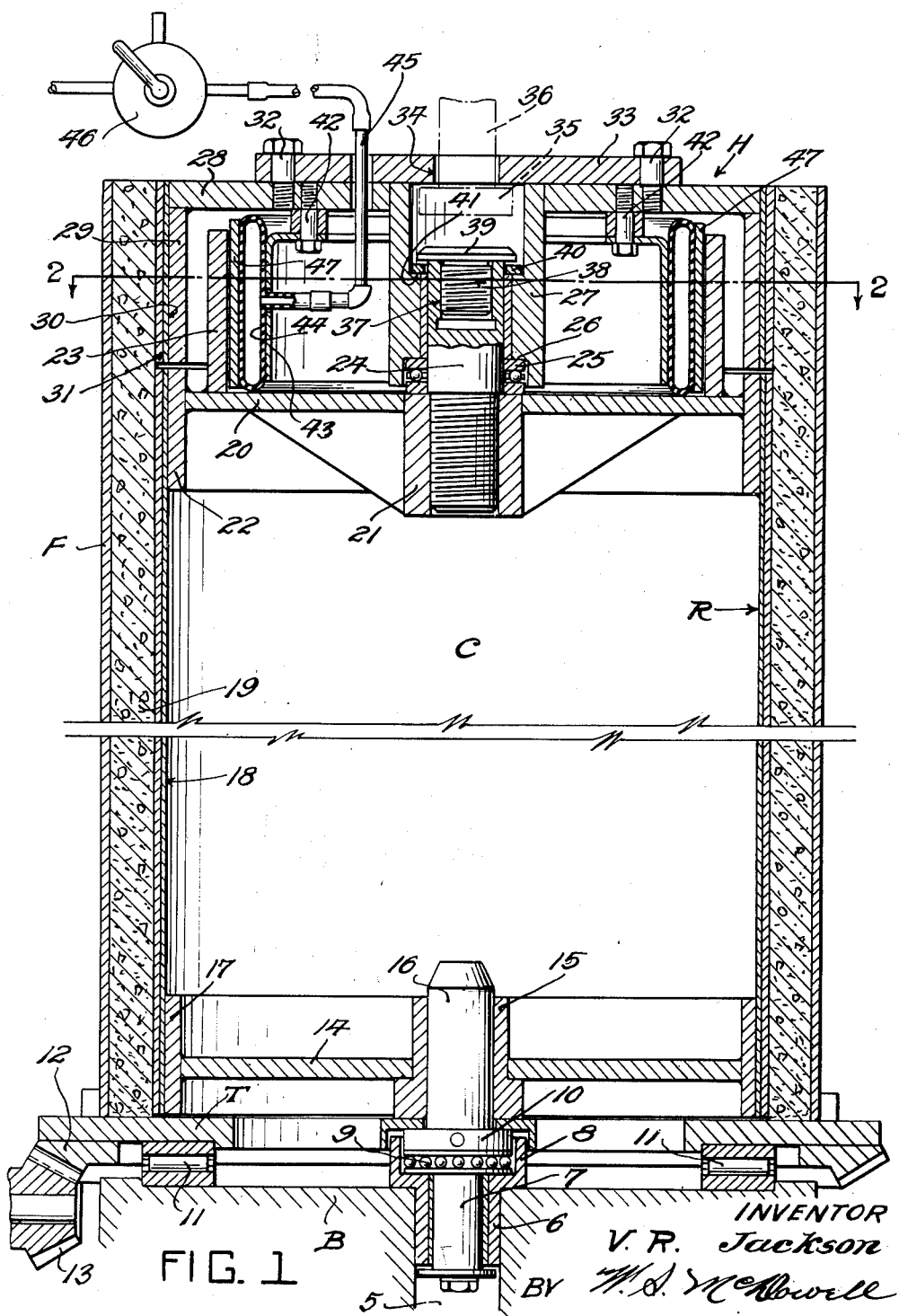
Fig. 1 is a vertical sectional view taken through a pipe-molding machine having a core member formed in accordance with the present invention.
Figure 2:
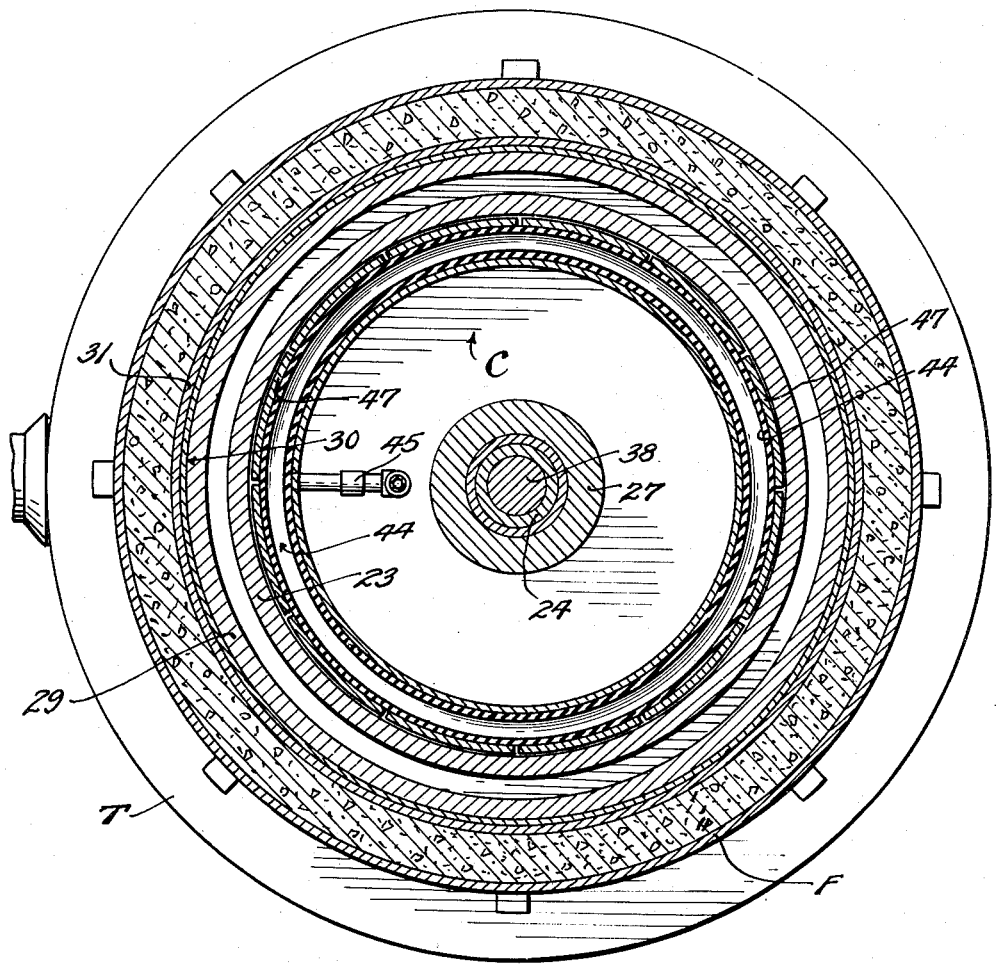
Fig. 2 is a horizontal sectional view taken on the plane indicated by the line 2—2 of Fig. 1.

In a preferred form of the present invention, I provide, as shown in the drawings, a core structure C and a cylindrical outer form F for the molding of tubular ceramic bodies. The core structure and outer form are adapted to be mounted in vertical concentric order on a horizontally positioned turntable T suitably supported in connection with a stationary bed B.

The bed may be formed to include a centrally disposed socket 5 in which is mounted a sleeve bearing 6 for the reception of a vertical pin or stud 7, about the vertical axis of which the entire mechanism rotates. The bearing 6 may be formed with a cupped upper end 8 in which may be disposed an antifriction thrust-receiving bearing 9 on which the flanged and diametrically enlarged central portion of a pin or stud 10 is seated for rotation. The turntable may rest on antifriction bearings 11 of the roller type supported by the bed B.

The under side of the turntable T may be provided peripherally with a gear ring 12, the teeth of which mesh with those of a pinion 13 driven from any suitable source of power, not shown. The core structure C and the outer form F rest on the upper surface of the turntable and revolve in unison therewith. The core structure and outer form are spaced relatively to each other and form an annular chamber therebetween into which cementitious material may be introduced and tamped by conventional means to produce a tubular body having required wall density and load-supporting characteristics.

In the present instance, the core structure C is formed to include a bottom plate or spider 14, the latter being provided centrally with a hub 15 which receives loosely the upper portion 16 of the stud 7. The plate includes an outer circular flange 17 which is mechanically fastened or welded to the inner sheet 18 of the core structure C at the open bottom of the latter. Preferably, the core structure includes an outer sheet 19 which is secured to the inner sheet 18 to form a composite straight walled tubular body of high mechanical strength.

At the upper end of the sheets 18 and 19 of the core structure, there is provided an upper reenforcing plate or spider 20, the latter being formed with a centrally disposed hub 21 which is arranged in vertical alignment and above the hub 15 of the bottom plate 14. The upper plate or spider is formed peripherally with a ring 22 which is welded or otherwise fastened to the upper and interior portion of the inner sheet 18 of the core structure. Additionally, the upper plate or spider 20 includes within but contiguous to the outer ring 22 an upstanding annular flange 23, which forms a part of the core structure clutch or brake, as hereinafter more particularly defined.

The hub 21 is interiorly threaded to receive the lower threaded end of a post 24, which is disposed in vertical registry with the stud 7. Surrounding the post 24 and positioned on the upper end of the hub 21 is a thrust bearing 25 upon which rests the interior shouldered region 26 of a tubular hub 27 formed with the center of the head section H of the core structure.

In the form of the invention illustrated, the head section H includes a horizontally disposed plate 28 formed integrally with or welded to the upper end of the hub 27. Depending rigidly from the outer peripheral edge of the plate 28 is a downwardly directed annular flange 29, which is disposed in registry with the ring 22 of the upper plate or spider 20. Also, the flange 29 carries circularly arranged inner and outer sheets 30 and 31, respectively, which register vertically with the inner and outer sheets 18 and 19 of the rotatable bottom section of the core structure C.

The plate 28 has fastened thereto, as by means of the bolts 32, a securing disk 33, the latter being formed with a central opening 34 which receives the swivel head 35 of a conventional coreraising and lowering means 36. By such means, the entire core structure may be lifted bodily so that it will be disposed above the plane of the outer form F and, also, that of a pipe or other tubular body molded therein. When so lifted, the form containing the finished body may be removed from the turntable and another form substituted therefor, after which the core structure is lowered until it again assumes the full line position disclosed in the drawings in which the bottom of the core structure rests on the turntable within and in concentric relation to the outer form.

The upper portion of the post 24 is provided with an internally threaded socket 37 which receives a screw 38 having an enlarged head 39, the under side of the latter engaging with a washer ring 40 positioned on a shoulder 41 formed internally of the hub 27. By this construction, the rotatable lower portion R of the core structure is united with the normally stationary head section H when the core structure is being raised or lowered bodily into and out of operative relationship with the turntable T.

To control the rotation of the section R of the core structure relative to the normally stationary head section H thereof, said head section has the plate 28 thereof provided with headed screw bolts 42 which support within and in connection with said head section an annular depending inner brake or clutch ring 43, which is disposed in concentric relationship with the outer upstanding flange or ring 23 of the plate 20. Supported in connection with the ring 43 is a fluid expansible, flexible walled annular tube 44. Fluid under pressure and obtained from any suitable source may be introduced into the tube or removed therefrom by means of the pipe lines shown at 45, which extend through the plate 28 and the disk 23 thereof and extend to a relatively remotely positioned fluid-flow governing valve 46, the outer portion of the tube 44 carrying one or more brake or clutch shoes 47.

In view of the foregoing, it will be apparent that if the core structure were formed so that it would be held stationarily by the frame-carried supporting means 36 associated with the head thereof, the rotation of the turntable and the molded cementitious body produced thereon would produce undesirable friction and wear and tear on the portions of the core structure in contact with the molded body. If the core structure, on the other hand, were allowed to rotate freely with the turntable during pipe formation, a marked degree of adherence would be apt to exist between the formed tubular body and the core structure following completion of the molded body and upon attempting to remove the core structure therefrom.

Therefore, in accordance with the present invention, I provide a core structure which includes the rotatable body section so formed as to revolve with the turntable during the process of manufacturing the pipe body, but which rotatable section will have its rotation braked or discontinued while that of the outer form is maintained, whereby to provide a means to break quickly and cleanly adhesion forces existing between the cementitious mix of the molded pipe body and the outer surfaces of the rotatable core structure, enabling the latter to be removed without injury to the pipe body and in a convenient and readily executed manner. Compressed air or any other suitable fluid under pressure may be used for controlling the inflation or deflation of the clutch or brake tube 44.

My improved device is thus simple to manufacture and may be conveniently used. It combines in one construction the advantages of both stationary and rotatable core members in concrete pipe manufacture, and removes most of the disadvantages present in the two types of cores. It will be appreciated that the construction as illustrated in the drawings and described in detail above is a preferred one, nevertheless there are a number of changes and variations which may be made in the construction of my improved core without departing from its essential operating functions and characteristics. Thus, while the fluid-actuated brakes are advantageous and convenient to employ, other braking devices capable of accomplishing equivalent functions may be used. Therefore, I reserve the right to employ all such variations and modifications of my invention that may be said to fall fairly within the scope of the following claims.

I claim:

1. A core structure for concrete molds comprising a cylindrical body, a cylindrical head section arranged at the upper end of said body and consistituting a continuation thereof, axially disposed journaling means carried by said head section for effecting the rotatable support of said core body about its principal axis, and fluid-actuated brake means carried by said head section and cooperative with said body for governing the rotation of the latter relative to said head section.

2. A core structure for concrete molding apparatus, comprising: a cylindrical and rotatable core body, a relatively stationary cylindrical head section arranged at the upper end of said body and constituting a continuation thereof, means carried centrally by said head section for supporting said body for rotation about its principal axis, brake mechanism arranged internally of said head section and disposed concentrically about said body-supporting means for engagement with the upper portion of said body, and governing the rotation of said body relative to said head section, and fluid-actuated means for controlling the operation of said brake mechanism.

3. A core structure for molding tubular ceramic bodies, comprising: a cylindrical body section, bearing means provided centrally at the lower end of said body section for effecting its rotational support on an associated revoluble base, a lifting head, bearing means carried by said head in registry with the bearing means at the lower end of said body section for enabling the latter to rotate about its principal axis, means uniting said body section with said head to enable said body section to be raised and lowered bodily in unison with said head, and brake means carried by said head cooperative with said body section for governing the rotation of the latter relative to said head.

4. A core structure for employment in the molding of tubular ceramic bodies, comprising: a vertically disposed cylindrical body, vertically spaced upper and lower internal reinforcing members forming a part of said body, a centrally disposed bearing provided on the lower of said reenforcing members for removably positioning said body in a definite location on a rotatable supporting base, a vertically movable non-rotatable lifting head constituting a cylindrical continuation of the upper portion of the rotatable body of said core structure, bearing means uniting the upper reenforcing member of said body with said lifting head to cause said body to move vertically in unison with the lifting and lowering movement of said head but to rotate relative to said head, a brake drum flange on the upper reenforcing member of said body, and frictional brake means carried by said head and cooperative with said flange for governing the rotation of said body relative to said head.

5. Apparatus for molding pipe comprising: a stationary base, a turntable, a stud projecting upwardly from said base and about which said turntable is rotatably mounted, a cylindrical core, a socket member disposed in the vertical axis of said core at the lower end thereof for removable placement on the stud above said turntable, an outer cylindrical form disposed concentrically on said turntable with respect to said core and spaced from the latter to provide an annular chamber for the reception of moldable pipe-forming materials, a non-rotatable vertically movable lifting head for said core, means disposed in registry with said stud 4 connecting the upper end of said core with said head to cause the core to be raised and lowered in unison with said head but to provide for the rotation of said core about its principal axis, and manually controlled brake means carried by said head and cooperative with the upper part of said core for arresting at will rotation of said core when the same is positioned on said turntable by locking the core to said head.

6. Apparatus for molding pipe as specified in claim 5, and wherein said brake mechanism is actuated by fluid pressure.

VINCENT R. JACKSON.

REFERENCES CITED

The following references are of record in the file of this patent:

UNITED STATES PATENTS

| Number | Name | Date |
|---|---|---|
| 1,297,208 | McMurtrie | Mar. 11, 1919 |
| 1,453,269 | Buente | May 1, 1923 |